Dec. 28, 1943.     T. NORTH ET AL     2,337,567
READING DEVICE
Filed May 24, 1941     6 Sheets-Sheet 1

INVENTOR.
Thomas North
Edward L. Mifflin
BY
ATTORNEYS

Dec. 28, 1943.  T. NORTH ET AL  2,337,567
READING DEVICE
Filed May 24, 1941  6 Sheets-Sheet 4

INVENTORS
Thomas North
Edward L. Mifflin
BY
ATTORNEYS

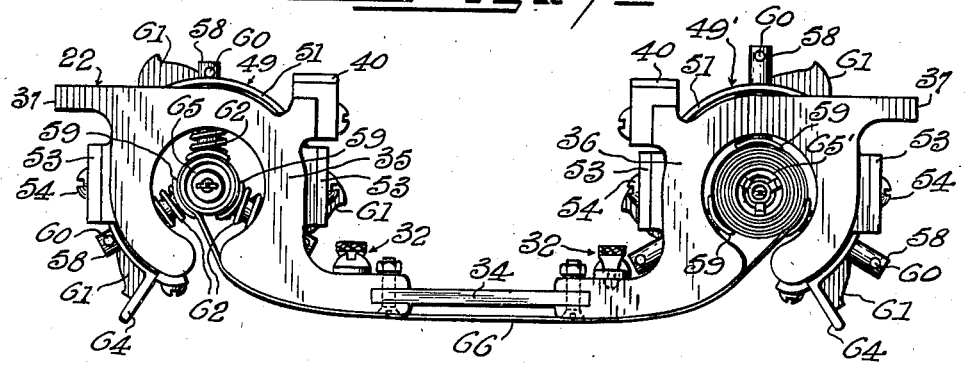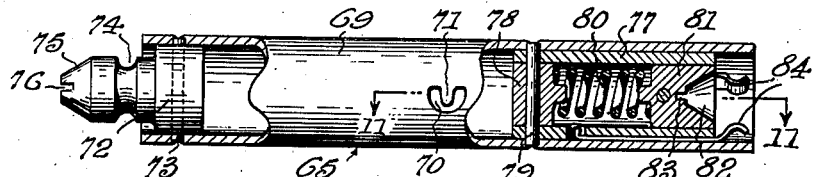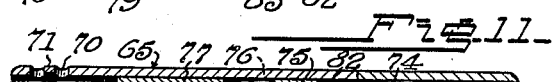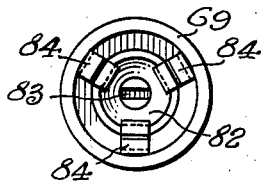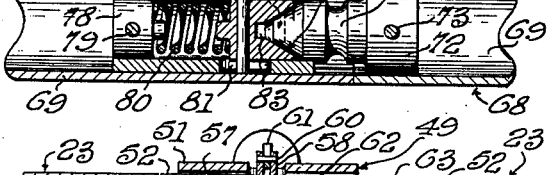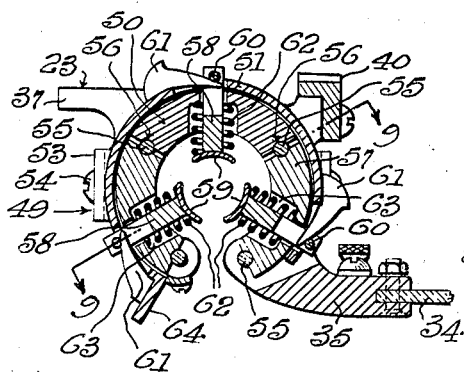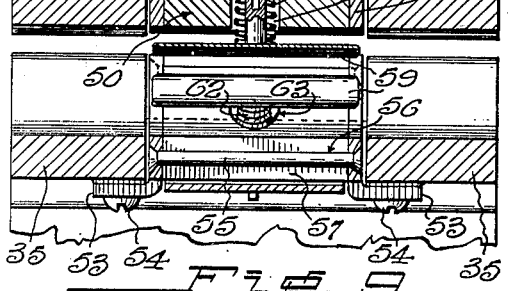

Dec. 28, 1943.   T. NORTH ET AL   2,337,567
READING DEVICE
Filed May 24, 1941   6 Sheets-Sheet 6

Inventors
Thomas North
Edward L. Mifflin
By
Attorneys

Patented Dec. 28, 1943

2,337,567

UNITED STATES PATENT OFFICE 2,337,567

READING DEVICE

Thomas North and Edward L. Mifflin, Jr.,
Washington, D. C.

Application May 24, 1941, Serial No. 394,976

6 Claims. (Cl. 40—86)

(Granted under the act of March 3, 1883, as
amended April 30, 1928; 370 O. G. 757)

This invention described herein may be manufactured and used by or for the Government for governmental purposes, without the payment to us of any royalty thereon.

This invention relates to reading devices, more particularly it is directed to map reading devices adapted to be used in connection with moving vehicles, particularly aircraft, to act as a guide for the operator of a vehicle in following different routes over which the vehicle may be traveling.

One of the objects of the invention is to provide a reading device including a transparent film strip having a photographically reduced micromap or other reading matter thereon, and a magnifying system adapted to magnify the micromap on the film strip to its approximate apparent original dimension and read concurrently by the user of the device with a minimum effort in accommodating the eyes.

Another object of the invention is to provide a reading device for use on moving vehicles comprising a casing having a light source and a magnifying system including eyepieces and reticle mounted thereon, carriages slidably mounted on the casing, spools mounted on each of the carriages, a transparent micro-map bearing film strip mounted on the spools of each of said carriages and adapted to be exposed under the magnifying system and above the light source, means adapted to be operated at will for moving the carriages transversely of the casing, whereby the film strips are moved under the magnifying system and above the light source for following a particular route over which the vehicle may be traveling and means adapted to rotate said spools to move the film strips longitudinally under the magnifying system and above the light source for following other routes over which the vehicle may be traveling, said micro-map bearing film strips adapted to be moved diagonally under the magnifying system and above the light source by a combination of the operation of said first and second mentioned means, whereby diagonal courses on the micro-maps on the film strips are exposed under the magnifying system and above the light source. The approximate portions of the micro-maps on the film strips are enlarged by the magnifying system to their approximate apparent original dimensions and viewed by the operator of the vehicle in following different routes over which the vehicle may be traveling.

Another object of the invention is to provide a series of film strips for use on the reading device, on each of which contiguous maps are reduced and reproduced photographically so that convergence incident to the map projection is removed and each strip consists of a continuous area of map of uniform width enabling the strips to be used in juxtaposition with other similar strips without hiatus between the map detail or overlap thereof.

Another object of the invention is to provide a method of producing a plurality of contiguous rectified maps on a film strip for use in the reading device which consists of rectifying and reproducing photographically a plurality of converging maps to a constant width, laying the rectified and reproduced maps together to form a series of contiguous maps, reproducing the series of contiguous maps to a reduced size onto a film strip of desired constant width whereby a contiguous area of map of uniform width is produced on the film strip, thereby enabling the film strip to be used in juxtaposition with other similar map bearing film strips without hiatus between the map detail or overlap thereof.

Another object of the invention is to provide in the optical system used on the reading device a reticle including markings which is adapted to be rotated at will on the optical system and so placed and viewed with respect to the map bearing film strips in the reading device that upon the rotation thereof the markings on the reticle will indicate a desired course on the map bearing film strips to be taken by a vehicle, courses parallel thereto and known increments of distance along the said courses.

Another object of the invention is to provide a map reading device which is light in weight, simple and practical in construction, neat and attractive in appearance, relatively inexpensive to manufacture and otherwise well adapted for the purpose for which it is intended.

Briefly stated, the map reading device comprises a suitable casing having a binocular magnifying system including eyepieces and an objective thereon, a recticle in the optical system for maintaining a course and to indicate distances between particular points on a course, a light source, carriages adapted to be detachably connected together slidably mounted on the casing, transparent portions provided on the carriages and disposed beneath the magnifying system and above the light source, reel spool equalizing and supporting devices mounted on opposite sides of the carriages, spools removably mounted on the reel spool equalizing and supporting devices, transparent micro-map bearing film strips carried by said spools and adapted to be wound from the spools on the combined reel spool equalizing and supporting devices on one side of the carriages to the spools on the reel spool equalizing and supporting devices on the other side of the carriages and beneath the transparent portions of the carriages, means for actuating the carriages including the spools and film strips longitudinally of the casing, whereby transverse portions of the micro-maps on the film strips may be observed through the eyepieces of the magnifying system for following a route over which the vehicle may be traveling, means for frictionally coupling certain ends of the spools on one carriage to certain ends of the spools on another carriage, whereby the spools may be independently and jointly rotated for moving the micro-map bearing film strips beneath the magnifying system and above the light source, means for rotating the spools to move the micro-map bearing film strips transversely of the casing, beneath the transparent portions of the carriages, whereby longitudinal portions of the micro-maps on the film strips may be observed through the eyepieces of the magnifying system for following other routes over which the vehicle may be traveling, said micro-map bearing film strips adapted to be moved obliquely beneath the magnifying system and above the light source by a combination of the transverse and longitudinal movements thereof produced by said first and third mentioned means, said reel spool equalizing and supporting devices adapted to hold the film strips under tension and to equalize the reel spools, as the micro-map bearing film strips are wound from the spools on one side of the carriages to the spools on the other side thereof and means for supporting the device on the user thereof. A reticle for use on the optical system and a method of producing a plurality of contiguous rectified maps on the film strips for use on the reading device is also included within the scope of the invention.

With the above and other objects and advantages in view, the invention consists of certain features of construction and operation of parts which will hereinafter appear and in which—

Fig. 7 is an end view of a carriage used in carrying out the invention removed from a casing including combined reel spool equalizing and supporting devices having spools carrying transparent film strips mounted thereon;

Fig. 8 is a fragmentary cross-sectional view of a combined reel spool equalizing and supporting device mounted on one side of a carriage taken on the line 8—8 of Fig. 2;

Fig. 9 is a fragmentary transverse sectional view taken on the line 9—9 of Fig. 8, through a reel spool equalizing and supporting device on one side of a carriage;

Fig. 10 is a longitudinal sectional view partly in elevation of one of a plurality of spools used in carrying out the invention;

Fig. 11 is a fragmentary sectional view partly in elevation of the ends of two spools detachably connected together;

Fig. 12 is an end elevation of a spool having latch springs provided thereon which are adapted to engage with a flanged plug provided on one end of another spool, whereby two spools may be frictionally connected together;

Fig. 13 is a fragmentary sectional view of the ends of two carriages taken on the line 13—13 of Fig. 1, and illustrating the manner of connecting the ends on one side of the carriages together by a spring latch;

Fig. 14 is a longitudinal detail sectional view of one of a plurality of keys adapted to be mounted on either end of the spools for rotating the spools;

Fig. 15 is a side elevation of the key illustrated in Fig. 14;

Figure 17:
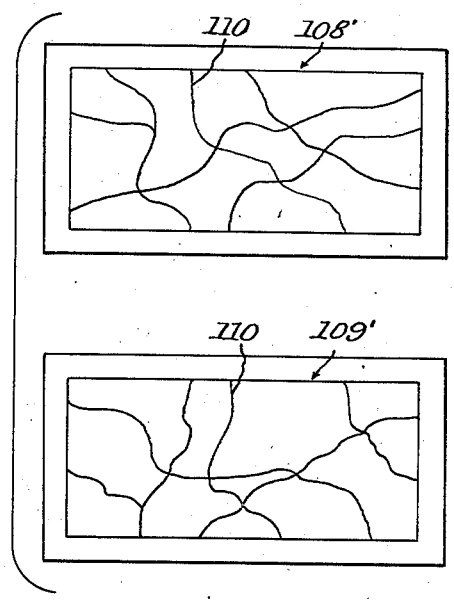
Fig. 17 illustrates the maps in Fig. 16, after being reduced and reproduced photographically to remove the convergence incident to the map projection.
Figure 18:
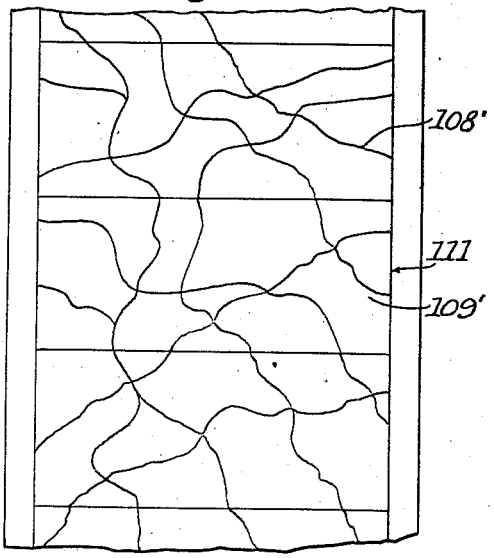
Figure 19:
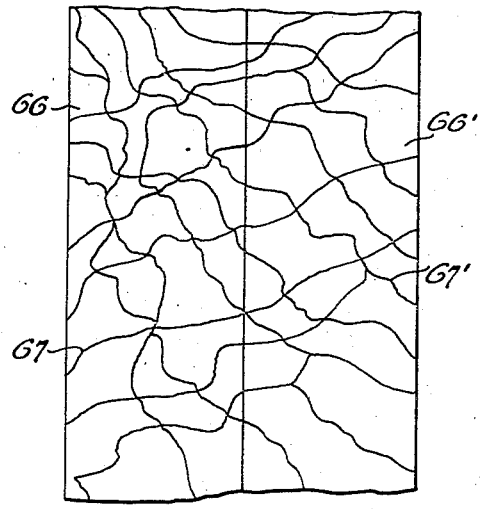

Fig. 18 illustrates the photographically reduced and reproduced maps in Fig. 17 laid together to form a continuous strip of usable map of constant width; and Fig. 19 illustrates the contiguous maps in Fig. 18 having been reduced and reproduced on a film strip of usual constant width and producing a continuous area of map of uniform width on the film strip with another film strip in juxtaposition therewith, having maps produced thereon as the other film strip for use in the reading device.

In the illustrated embodiment characterizing the invention an open-ended substantially oblong shaped casing 1 is provided having apertures 2 and 3 formed in the upper wall 4 thereof in which a pair of vertically extending sight tubes 5 and 6 having eyepieces 7 and 7' respectively adjustably mounted on the upper ends thereof. The eyepieces 7 and 7' which are part of a binocular magnifying or optical system used in carrying out the invention, are provided with lenses 8 and 8' respectively and are preferably made of soft rubber to prevent injury to the user of the device, particularly an aviator when the air is bumpy.

The sight tube 6 of the eyepiece 7' is rotatably mounted on the upper wall 4 of the casing by means of the knurled portion 6' and is provided with a reticle indicated generally by A which is adapted to be used in maintaining a course over which an airplane or other vehicle may be traveling, also for indicating a desired course, indicating courses parallel thereto and known increments of distance along the courses.

Any suitable binocular magnifying or optical system may be used in carrying out the invention, but for purposes of illustration the system may consist of the sight tubes 5 and 6 having the eyepieces 7 and 7' thereon and two right-angled glass prisms 9 and 9' respectively mounted within the casing 1 and disposed to reflect light toward each other. The glass prisms 9 and 9' are positioned beneath the apertures 2 and 3 respectively in a housing 10 which is suitably secured to the upper wall 4 of the casing by screws 10'. The housing 10 has an internally threaded aperture 11 in the center of the lower wall 12 thereof. Adjacent to the aperture 11 within the housing 10 are two right-angled polished prisms 13 and 13' having their diagonal surfaces 14 and 14' respectively put together, forming a square prism block which is in alignment with the prisms 9 and 9' and adapted to reflect light from the prisms 9 and 9' through the aperture 11 in the housing 10, as illustrated by the arrows in Fig. 2. A central optical tube forming an objective 15 having a lens 16 in its upper and lower ends respectively is connected at its upper end in the aperture 11 of the prism housing 10 and extends vertically downward therefrom terminating closely adjacent to the bottom wall 17 of the casing 1. The bottom wall 17 of the casing 1 is provided with a centrally located aperture 18 which is in alignment with the optical tube 15 and closed by a housing 19 for a light source in the form of a lamp 20 adapted to project light rays up through the aperture 18, for a purpose which will hereinafter appear. The light source 20 is adapted to be connected by conductors 21 to any suitable source of electrical supply (not shown) such as that used on airplanes.

The casing 1 is designed so that one or more combined spool carrying and bridge members or carriages may be slidably mounted in the casing. In the present illustration two carriages 22 and 23 are provided in the casing 1 which are caused to abut against each other at one of their ends and are detachably connected together at their abutting ends by spring latches 24 provided on the abutting ends of the carriages. One of the spring latches 24 is connected on one side of the abutting end of one carriage and another of the spring latches 24 is connected on an opposite side of the abutting end of the other carriage on which a spring latch is mounted. When the carriages are not connected together the spring latches 24 are actuated to cause the bead 29 on the thumb lift 28 to engage in a depression 31 formed in the same ends of the carriages on which the spring latches are mounted. The free ends of the carriages 22 and 23 are also provided with spring latches 32 of the same construction and operation as the spring latches 24 and with depressions 33 whereby the carriages may be detachably connected together at either end, thus permitting the carriages to be reversible or connected to the ends of other carriages (not shown).

The carriages 22 and 23 are each provided with a central horizontally extending transparent portion 34 made of heavy glass or the like and having pairs of supporting brackets 35 and 36 of substantially inverted C-shaped formation provided thereon. The pair of supporting brackets 35 extends outwardly from one of the longitudinal edges of the transparent portion 34 closely adjacent to the ends thereof and the pair of supporting brackets 36 extends outwardly from the other longitudinal edge adjacent to the ends of the transparent portion 34, in a diametrically opposite direction from the pair of supporting brackets 35. The carriages are slidably mounted in the casing by means of tongues or runners 37 formed integrally with the supporting brackets 35 and 36. The tongues or runners 37 extend outwardly from the brackets 35 and 36 and are adapted to slidably engage in longitudinally extending grooves or guide slots 38 formed on the inner surfaces of the side walls 39 of the casing.

To actuate the carriages 22 and 23 when connected together within the casing 1 for a purpose which will hereinafter appear, each of the carriages is provided with a pair of tooth racks 40 which extend longitudinally of the carriages between the pairs of supporting brackets 35 and 36. The tooth racks 40 are adapted to be engaged by pinions 41 mounted on the ends of a transversely extending shaft 42 which is in turn rotatably mounted on a support 43 suitably secured at its upper end to the upper wall 4 of the casing. A bevel gear 44 is also mounted on the shaft 42, which bevel gear 44 meshes with a bevel gear 45 mounted on a shaft 46 which is journaled in a cap 47 covering an opening 48, formed in the upper wall 4 of the casing as more particularly illustrated in Fig. 2. The shaft 46 extends vertically upward through the cap 47 and has a knurled finger wheel 46' mounted on its upper end whereby the carriages 22 and 23 may be actuated longitudinally within the casing by means operable from without the casing.

Between the pairs of supporting brackets 35 and 36 on opposite sides of each of the carriages 22 and 23 are combined reel spool equalizing and supporting devices 49 and 49' respectively, which are substantially of an inverted C-shaped formation, each comprising as more particularly illustrated in Figs. 8 and 9, a member 50 having a partial sleeve 51 movably mounted thereon, and ring-shaped end plates 52 having ears 53 formed thereon which are secured to the brackets 35 and 36 of the carriages in any suitable manner such as by screws 54. The plates 52 on each end of the combined reel spool equalizing and supporting devices are joined together by means of rivets 55 which extend through the member 50 at 56, as illustrated in Figs. 8 and 9. The member 50 is made up of a trio of arcuate sections 57 having spring actuated arms or fingers 58 movably mounted thereon. The inner ends of the arms 58 are provided with arcuate shoes 59 and the outer ends thereof extend through the sections 57 of the member 50 and have pins 60 mounted thereon. The pins 60 are adapted to be engaged by suitably shaped cams 61 secured at one of their ends at spaced intervals on the partial sleeve 51 and adapted to actuate the arms 58 outwardly against the action of coil springs 62. The coil springs 62 surround the arms 58 and are adapted to be expanded and contracted in wells 63 formed in the sections 57 of the member 50, with the outer ends of the springs in the wells 63 abutting against the member 50 and the inner ends thereof abutting against the arcuate shoes 59 on the inner ends of the arms.

A lever or finger engaging portion 64 is formed on the partial sleeves 51 for manually moving the partial sleeves around on the members 50, whereby the free ends of the cams 61 are caused to engage with the pins 60 on the outer ends of the arms 58 for actuating the arms outwardly against the action of the coil springs 62 and causing the arcuate shoes 59 on the inner ends of the arms to be moved outwardly, thus permitting a pair of spools 65 and 65' carrying a transparent film strip or ribbon 66 having a continuous map area 67 or other matter to be read thereon, as illustrated in Fig. 19 to be inserted in the combined reel spool equalizing and supporting devices 49 and 49' on opposite sides of the carriage 22 and a pair of spools 68 and 68' carrying a transparent film strip 66' having a continuous map area 67 or other reading matter thereon, to be inserted in the combined reel spool equalizing and supporting devices 49 and 49' on opposite sides of the carriage 23. The effects of the reel spool equalizing and supporting devices are first to maintain a constant desired tension of the film strips, and second to keep the observed part of the film strips in focus.

Figure 16:
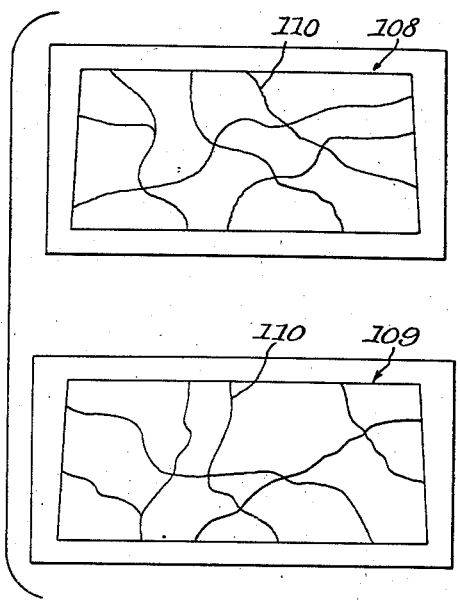
Fig. 16 illustrates two maps which are to be reduced and reproduced photographically so that convergence incident to the map projection is removed, for use on the film strips in carrying out the invention.

In producing the continuous map area 67 and 67' on the film strips 66 and 66' respectively, as illustrated in Fig. 19, a series of maps is provided. For purposes of illustration two maps 108 and 109 of the series of maps which have a trapeziform shape and of different widths are shown in Fig. 16. Each map of the series of maps which extend in a north and south direction is so rectified photographically that the usable portion 110 of the maps 108 and 109 is reduced to a constant width. The rectified maps 108' and 109' are then laid together to form a continuous strip 111 of usable map of constant width. The continuous strip 111 containing the rectified maps 108' and 109' is then reduced and rephotographed on the film strip 66 of desired constant width, thereby producing the continuous area of map 67 on the film strip 66. Similar reduced and rephotographed film strips such as the film strip 66' containing the continuous area of map 67' are produced for other map series eastward and westward from the series of maps above described and may be used in juxtaposition, as illustrated in Fig. 19, with the strip 66 and with appropriate strips to form a continuous map without hiatus or overlap between adjacent film strips.

The spools are of the same construction, each comprising a tubular member 69 made of any suitable material such as aluminum and having a slot 70 centrally of its length in which a prong 71 is formed, as illustrated in Figs. 10 and 11, for the insertion of one end of one of the micromap bearing film strips 66 or 66', whereby the film strips are held on the spools without slipping. The tubular member 69 of each spool is also provided with means in its ends for frictionally and rotatably coupling two or more spools together. In one end of the tubular member 69 is a flanged plug 72 which is secured to the tubular member by a pin 73. The flange plug 72 which projects outwardly from the end of the tubular member 69 has an annular groove 74 formed thereon and terminates in a frusto-conical shaped portion 75 containing a slot 76 on the outer end thereof for a purpose which will hereinafter appear. In the other end of the tubular member 69 of each spool is a short tubular section 77 which is closed at its inner end by a plug 78 and secured to the tubular member 69 by a pin 79. Within the short tubular section 77 of the tubular member 69 is a coil spring 80 which abuts at its inner end against the plug 78 and at its outer end against the inner end of a block member 81. The block member 81 is slidably mounted in the end of the tubular section 77 and has a conical recess 82 containing a slot 83 formed in its outer end. Latch springs 84 are provided on the last mentioned end of the tubular member 69, which latch springs 84 are suitably secured at their inner ends to the tubular member and are suitably bent at their free ends.

Figure 3:
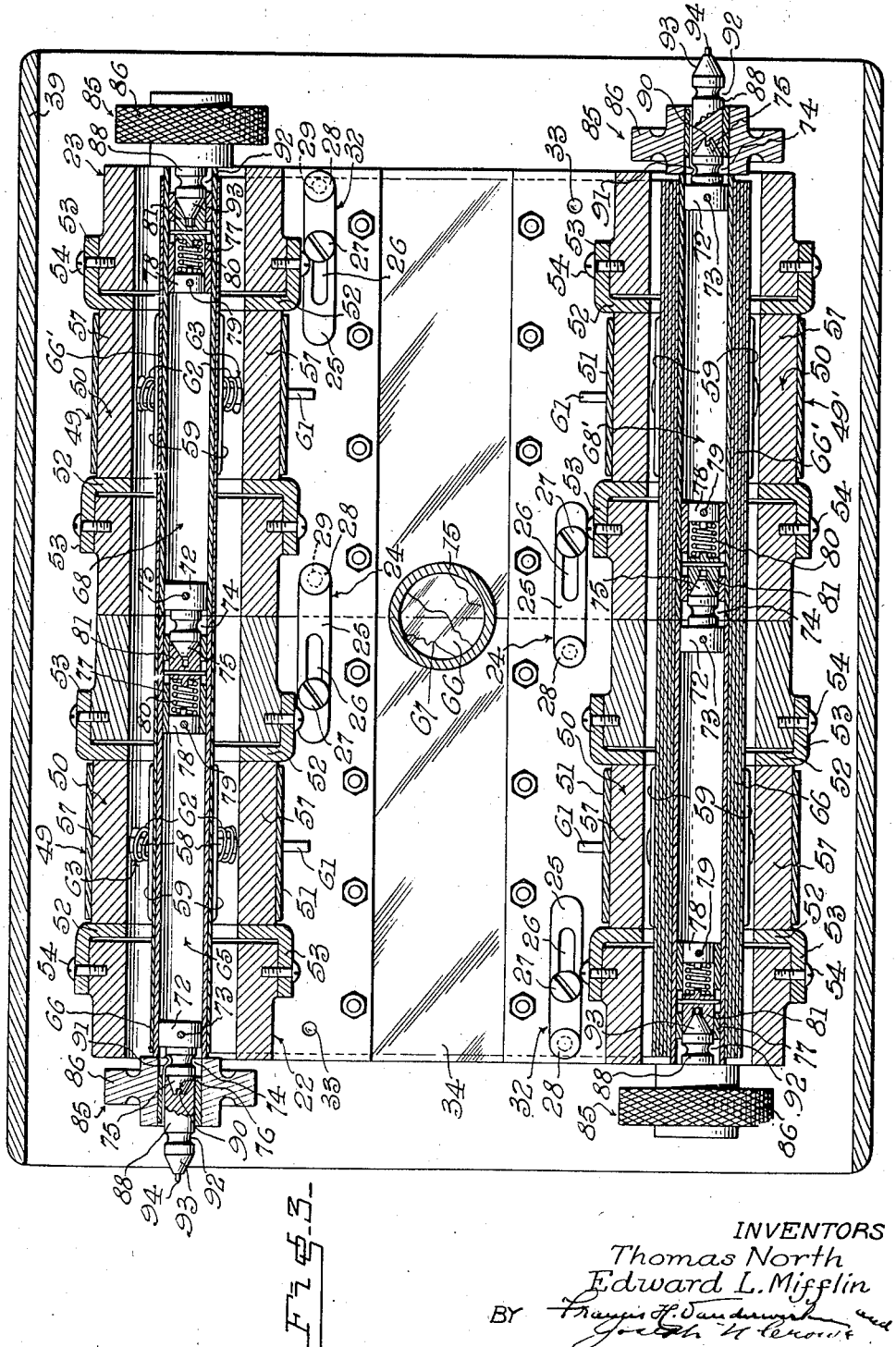
Fig. 3 is a horizontal sectional view of the reading device taken on the line 3—3 of Fig. 2.

The pair of spools 65 and 65' on the carriage 22 and the pair of spools 68 and 68' on the carriage 23 are reversible and interchangeable by means of the latch springs 84 provided on one of their ends which are adapted to be detachably connected to the flange plug 72 on one of the other ends thereof. In the present illustration the latch spring end of the spool 65 on the carriage 22 is caused to be detachably connected to the flange plug end of the spool 68 on the carriage 23 and the flanged plug end of the spool 65 on the carriage 22 is caused to be detachably connected to the latch spring end of the spool 68' on the carriage 23, as illustrated in Fig. 3.

In connecting the ends of two spools on one carriage to the ends of the spools on another carriage, as illustrated in detail in Figs. 11, the flange plug 72 on one end of one spool is inserted in the end of an adjacent spool having the latch springs 84 thereon, whereby the bent ends of the latch springs 84 on one end of a spool are caused to engage in the annular groove 74 on the flange plug 72 on one end of another spool, with the frusto-conical shaped portion 75 of the flange plug seating in the conical recess 82 formed in the outer end of the block member 81 on the end of a spool containing the latch springs 84, thus forming a friction clutch coupler and providing a rotative connection between the adjacent ends of adjacent spools on the carriages.

Each of the spools may be rotated by means of a plurality of interchangeable keys 85 which are adapted to be mounted on either end of the spools. The keys illustrated separately in Figs. 14 and 15 comprise a turning knob 86 provided with a central opening 87 extending therethrough and having a plug 88 mounted therein. The inner end of the plug 88 extends into the opening 87 of the turning knob and has a conical recess 89 and a blade projection 90 provided therein. Latch springs 91 are secured at their inner ends to the keys, with the free ends thereof being suitably bent and extending outwardly from the inner end of the plug 88. The other end of the plug 88 extends outwardly from the turning knob 86 and is provided with an annular groove 92 and a frusto-conical shaped portion 93 having a blade projection 94 thereon.

To attach the interchangeable keys to the free ends of the connected spools having the flange plug 72 mounted thereon, the side of the turning knob 86 of the keys containing the latch springs 91 is placed on the flange plug 72 on one end of the spools, whereby the bent ends of the latch springs 91 on the keys are caused to engage in the annular groove 74 on the flange plug of the spools, with the conical recess 89 on the keys being seated on the frusto-conical shaped portion 75 on the flange plug 72 of the spools and the blade projection 90 of the keys fitting into the slot 76 on the flange plug 72 of the spools. To attach the keys to the ends of the spools containing the latch springs 84, the side of the keys having the plug 88 extending outwardly therefrom is placed on the end of the spools containing the latch springs, whereby the frusto-conical shaped portion 93 on the plug 88 of the keys is caused to seat in the conical recess 82 formed in the block member 81 on one end of the spools, with the blade projection 94 on the keys engaging in the slot 83 in the block member 81 on the spools and the annular groove 92 on the plug 88 of the keys being engaged by the bent ends of the latch springs 84 on the spools, whereby a positive connection is provided between the keys and the ends of the spools.

Figure 1:
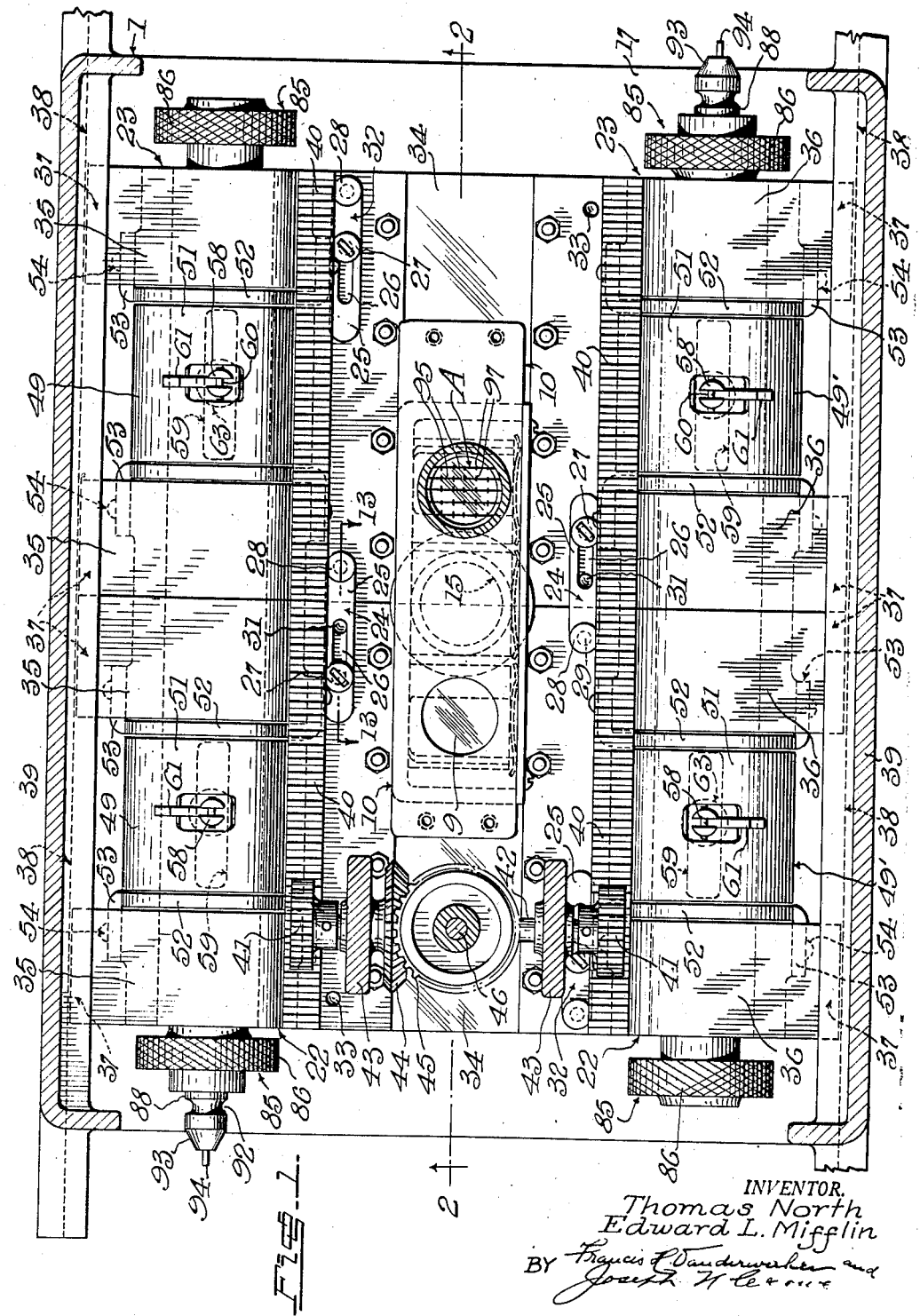
Fig. 1 is a longitudinal sectional view of the improved reading device taken on the line 1—1 of Fig. 2.
Figure 2:
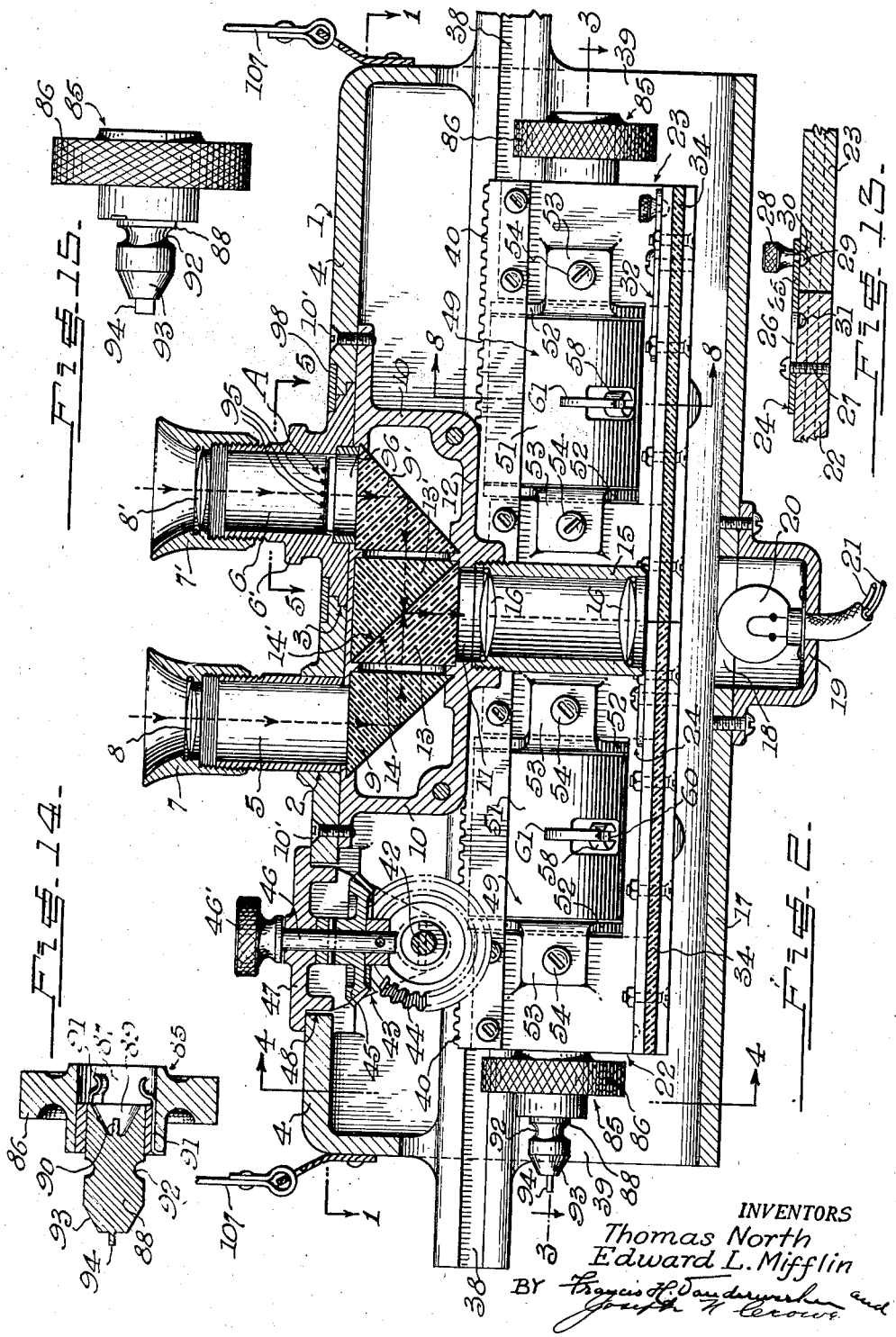
Fig. 2 is a longitudinal sectional view thereof partly in elevation taken on the line 2—2 of Fig. 1.
Figures 4, 5, 6:
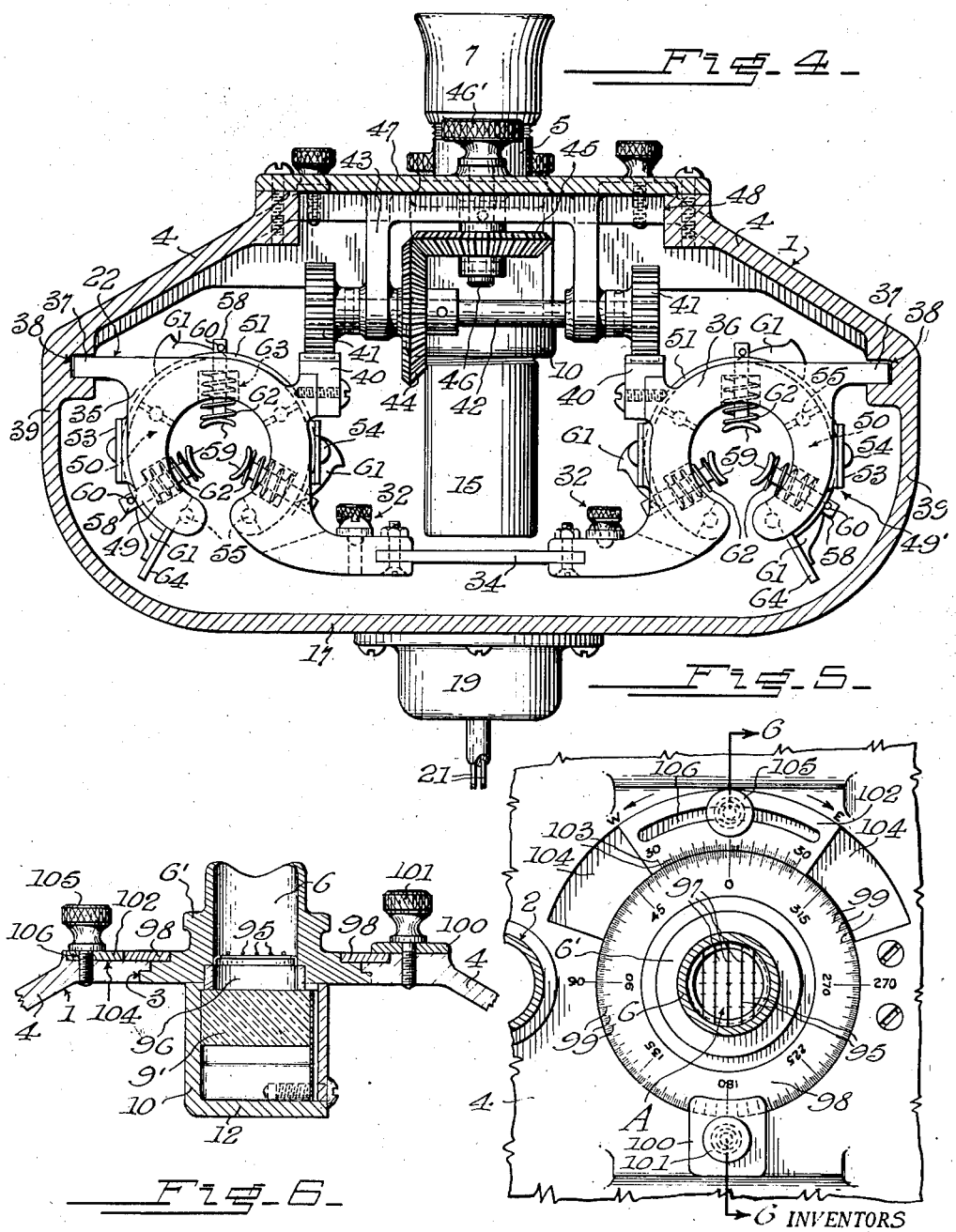
Fig. 4 is a vertical sectional view taken on the line 4—4 of Fig. 2, with spools and transparent film strips removed from carriages mounted in a casing.
Fig. 5 is a fragmentary cross-sectional view through an eyepiece used in carrying out the invention taken on the line 5—5 of Fig. 2, and illustrating a reticle cooperating with the eyepiece for maintaining a course over which an airplane or other vehicle may be traveling.
Fig. 6 is a fragmentary vertical sectional view through the eyepiece and reticle taken on the line 6—6 of Fig. 5.

The reticle A for maintaining a course when using the device in following a route over which an airplane may be traveling and also for indicating distances along the course, consists of a plurality of parallel lines 95 provided within the sight tube 6 of the eyepiece 7'. The parallel lines 95, which are at fixed intervals apart, are provided on the upper end of a ring member 96 within the lower end of the sight tube 6. In the present illustration there are shown five parallel lines 95 which should be a suitable distance apart such as substantially 0.153 inch, with each line being notched or marked to provide cross lines 97 in the same intervals as they are placed apart, such lines and their markings originating at the center of the sight tube 6 of the eyepiece 7'. A graduated flat ring-shaped member 98 marked in degrees or graduations 99 is adapted to engage with the sight tube 6 of the eyepiece 7' and with the upper surface of the upper wall 4 of the casing, as illustrated in Figs. 2, 5 and 6. A friction clamp 100 is provided which is adapted to hold the sight tube 6 and hence the reticle A in any desired azimuth, said friction clamp having a thumb screw 101 threadably mounted thereon and engaging the upper wall 4 of the casing. The friction clamp 100 engages the upper surface of the ring-shaped member 98 which in turn is caused to frictionally engage the sight tube 6 of the eyepiece 7', thus holding the sight tube 6 and hence the reticle A in any adjusted position. Mounted on the upper wall 4 of the casing is a graduated arcuate shaped index 102 for the graduated ring-shaped member 98, as illustrated in Fig. 5. The index 102 which is marked in degrees 103 has its inner graduated edge abutting against a portion of the circumferential edge of the flat ring-shaped member 98 and is adjustably mounted in an arcuate groove 104 by means of an adjusting screw 105. The adjusting screw 105 extends through an elongated arcuate slot 106 provided in the arcuate index 102 and threadably engages the upper wall 4 of the casing, thus providing a means for applying magnetic declinations or similar variations for directional purposes. The arcuate groove 104 is made of a sufficient length that the arcuate index 102 may slide up to 30° east or west of the center index so that the magnetic declination may be set off with respect to the true north θ. A strap 107 may be provided on the casing 1, as illustrated in Fig. 2, for hanging the device about the neck.

In using the improved map reading device an air navigation map 67, as illustrated in Fig. 16, or other matter to be read is first photostatically reduced to a microscopic size and then reproduced on the transparent film strips 66 and 66'. One end of the film strip 66 is attached to the spool 65 of the pair of spools 65 and 65' on the carriage 22 by means of the prong 71 thereon which extends into the slot 70 formed in the spool 65, as illustrated in Figs. 10 and 11, and then the film strip 66 is wound sufficiently on the spool so that it may be inserted in the combined reel spool equalizing and supporting device 49 on one side of the carriage 22, with the spool 65' being inserted in the combined reel spool equalizing and supporting device 49' on the other side of the carriage 22. In order to place the reel spool 65 having the film strip 66 thereon in the combined reel spool equalizing and supporting device 49 and the spool 65 in the combined reel spool equalizing and supporting device 49', the partial sleeve 51 on the combined reel spool equalizing and supporting device 49 is moved around in a clockwise direction or to the right and the partial sleeve 51 on the combined reel spool equalizing and supporting device 49' is moved in a counter-clockwise direction or to the left by means of the levers 64, whereby the free ends of the cams 61 on the partial sleeves 51 are caused to engage with the pins 60 on the outer ends of the arms 58 of the combined reel spool equalizing and supporting devices 49 and 49', thus causing the arms 58 to be moved outwardly against the action of the coil springs 62 which causes the shoes 59 on the inner ends of the arms to be moved radially outward and permits the spool 65 having the film strip 66 thereon to be inserted in the combined reel spool equalizing and supporting device 49 and the spool 65' to be inserted in the combined reel spool equalizing and supporting device 49'.

The free end of the transparent film strip 66 on the spool 65 on one side of the carriage 22 is then attached to the spool 65' on the other side of the carriage with a portion of the intervening section of the film strip 66 between the spools 65 and 65' underlying the transparent portion 34 of the carriage 22. The pair of spools 68 and 68' having the transparent film strip 66' thereon are mounted on the combined reel spool equalizing and supporting devices 49 and 49' on opposite sides of the carriage 23 in the same manner as the spools 65 and 65' are mounted on the combined reel spool equalizing and supporting devices 49 and 49' on the carriage 22, with a portion of the intervening section of the film strip 66' bridging the spools 68 and 68' and underlying the transparent portion 34 of the carriage 23.

By rotating the partial sleeves 51 on the combined reel spool equalizing and supporting devices 49 on the carriages 22 and 23 in a counter-clockwise direction and the partial sleeves 51 on the combined reel spool equalizing and supporting devices 49' on the carriages in a clockwise direction, the cams 61 on the sleeves 51 are disengaged from the pins 60 on the outer ends of the arms 58, thereby releasing the arms and causing them to be moved inwardly under the action of the coil spring 62 until the shoes 59 on the inner ends of the arms frictionally engage the film strips 66 and 66' on the spools of the carriages, whereby the spools are centralized when a change in size is caused by wrapping the film strips on one spool onto another, as illustrated in Fig. 7, and the spools are supported in an equalized manner on the combined reel spool equalizing and supporting devices.

After the spools and film strips have been mounted on their respective reel spool equalizing and supporting devices on the carriages, the carriages may be actuated longitudinally back and forth within the casing by means of the carriage actuating mechanism as above described, thereby causing transverse portions of the transparent film strips between the longitudinal edges thereof, which bridge the transparent portions 34 of the carriages to be exposed beneath the optical tube or objective 15 of the binocular magnifying system and above the light source 20, which optical tube 15 has a diameter less than the width of the transparent film strips thus by viewing the micro-maps 67 and 67' or other reading matter on the film strips, through the eyepieces 7 and 7', any desired part of the transverse portions of the micro-maps 67 and 67' on the film strips is greatly magnified and apparently restored to its original dimensions and read concurrently by the user of the device with a minimum of effort in following a route over which the airplan or other vehicle may be traveling.

By turning one of the keys 85 on the free ends of the spools, all of the spools may be rotated in unison, thereby moving the film strips 66 and 66' on the carriages 22 and 23 respectively in unison transversely of the carriages and causing longitudinal portions of the transparent film strips which bridge the transparent portions 34 on the carriages to be exposed beneath the optical tube or objective 15 of the magnifying system and above the light source 20, whereby any desired part of the longitudinal portions of the micromaps on the film strips is greately magnified and restored to its apparent original dimensions by the magnifying system in following another route over which the airplane may be traveling. The film strips 66 and 66' on the carriages 22 and 23 respectively may be moved obliquely under the optical tube or objective 15 of the magnifying system and above the light source 20 by moving the carriages longitudinally in the casing and by actuating one of the keys 85 on the free ends of the spools, whereby other routes on the micromaps 67 and 67' running obliquely on the film strips may be exposed under the optical tube 15 of the magnifying system and above the light source in following other routes over which the airplane may be traveling. Should it be desired to move one spool on the carriage 22 at a different speed than an adjacent spool on the carriage 23, the key on one end of one spool is held stationary and the key on one end of the adjacent spool is rotated. This is accomplished by means of the friction clutch coupler between the spools as above described, thus permitting the transparent film strips or ribbons 66 and 66' on the spools to be omitted and synchronized.

The film strips are mounted on the spools in such a manner as to cause the adjacent longitudinal edges of the film strips to substantially touch each other. After the micro-map bearing film strip on one carriage has been used in following different routes thereon, the carriage containing the film strip is removed from the casing and another carriage containing an additional micro-map bearing film strip is mounted in the casing.

In order to set a desired course the sight tube 6 of the optical system is rotated by means of the knurled portion 6' thereon to rotate the reticle A to a suitable position determined by means of the graduated ring-shaped member 98 and its graduations 99. If it is necessary to compensate for magnetic declination or other such variation, the arcuate index 102 is moved to a suitable point in the proper direction and clamped in an adjusted position by means of the adjusting screw 105 prior to rotating the reticle A as described above. The spacing of the lines 95 of the reticle A and cross lines 97 thereon serves to indicate regular increments of distance on the micro-maps 67 and 67' on the transparent film strips 66 or 66' respectively, along or transversely to the desired course at a given latitude; for other latitudes a predetermined coefficient is used to multiply the said regular increments in order to obtain the true increments.

It will thus be seen that there is provided a novel and efficient form of reading device which is well adapted for the purpose indicated. Even though there has been herein shown and described certain features of construction and operation of parts, it is nevertheless to be understood that various changes may be made therein if the changes do not depart from the claims.

Having described our invention, what we claim as new and wish to secure by Letters Patent is:

1. In a reading device adapted for use on a vehicle for following different routes over which a vehicle may be travelling comprising in combination a longitudinally extending casing having a magnifying device and a light source provided thereon, a transversely extending carriage slidably mounted in said casing, said carriage including a longitudinally extending transparent portion disposed beneath said magnifying device and above said light source, pairs of brackets mounted on said transparent portion, one pair of said brackets extending outwardly from a longitudinal side edge of said transparent portion and another pair of said brackets extending outwardly from another longitudinal side edge thereof in a diametrically opposite direction from said first-mentioned pair of brackets, supporting members, one of each of said supporting members mounted between one of each of said pairs of brackets, spring-pressed arms movably mounted on said supporting members, spools carry a transparent map strip removably mounted on said spring-pressed arms on said supporting members, said map strip extending from one spool on one side of the carriage to another spool on another side of the carriage transversely beneath said transparent portion and above said light source, means including gears for actuating said carriage longitudinally of said casing, whereby any desired transverse portion of said map strip may be exposed under said magnifying device and above the light source for following a route over which the vehicle may be travelling, means for rotating said spools to move said map strip transversely of said casing, whereby any desired longitudinal portion of the map strip may be exposed above said light source and beneath said magnifying device for following other routes over which the vehicle may be travelling and means including cams mounted on said supporting members and adapted to be actuated for operating said spring-pressed arms out of engagement with said spools, whereby the spools may be removed from said carriage and other spools carrying another transparent map strip may be substituted therefor.

2. In a reading device adapted for use as a vehicle for following different routes over which a vehicle may be travelling comprising in combination a longitudinally extending casing having a magnifying device and a light source provided thereon, a transversely extending carriage slidably mounted in said casing, said carriage including a longitudinally extending transparent portion disposed beneath said magnifying device and above said light source, pairs of brackets mounted on said transparent portion, one pair of said brackets extending outwardly from a longitudinal side edge of said transparent portion and another pair of said brackets extending outwardly from another longitudinal side edge thereof in a diametrically opposite direction from said first-mentioned pair of brackets, combined reel spool equalizing and supporting devices, one of each of said combined reel spool equalizing and supporting devices mounted between one of each of said pairs of brackets, said reel spool equalizing and supporting devices comprising supporting members including arcuate shaped segments, arms movably mounted on said arcuate shaped segments, springs mounted on said arms, sleeves movably mounted on said supporting members, cams provided on said sleeves, said cams upon the movement of said sleeves on said supporting members adapted to actuate said arms against the action of said springs, spools carrying a transparent map strip removably mounted on said arms, said map strip extending from one spool on one side of the carriage to another spool on another side of the carriage transversely beneath said transparent portion and above said light source, racks provided on said carriage and means including gears engaging said racks for actuating said carriage longitudinally of said casing, whereby any desired transverse portion of said map strip may be exposed above said light source and under said magnifying device for following a route over which the vehicle may be travelling and means for rotating said spools to move said map strip transversely of said casing, whereby any desired longitudinal portion of the map strip may be exposed above said light source and under said magnifying device for following other routes over which the vehicle may be travelling, and means for moving said sleeves on said supporting members for moving said cams into engagement with said arms for actuating the arms out of engagement with said spools against the action of said springs, whereby said spools may be removed from said carriage and other spools carrying another transparent map strip may be placed thereon.

3. A carriage adapted to be slidably and removably mounted within a viewing device and including a longitudinally extending transparent portion, pairs of brackets mounted on said transparent portion, one pair of said brackets extending outwardly from a longitudinal side edge of the transparent portion and another pair of said brackets extending outwardly from another longitudinal side edge thereof in a diametrically opposite direction from said first-mentioned pair of brackets, supporting members, one of each of said supporting members mounted between one of each of said pairs of brackets, spring-pressed arms movably mounted on said supporting members and adapted to removably support film strip carrying spools and means including cams mounted on said supporting members and adapted to be actuated for operating said spring-pressed arms out of engagement with the film strip carrying spools whereby the film strip carrying spools may be removed from the carriage.

4. A carriage adapted to be slidably and removably mounted within a viewing device and including a longitudinally extending transparent portion, pairs of brackets mounted on said transparent portion, one pair of said brackets extending outwardly from a longitudinal side edge of the transparent portion and another pair of said brackets extending outwardly from another longitudinal side edge thereof in a diametrically opposite direction from said first-mentioned pair of spools, combined reel spool equalizing and supporting devices, one of each of said combined reel spool equalizing and supporting devices mounted between one of each of said pairs of brackets and comprising supporting members including arcuate shaped segments, arms movably mounted on said arcuate shaped segments and adapted to removably support film strip carrying spools, springs mounted on said arms and adapted to force said arms into engagement with the film strip carrying spools, sleeves movably mounted on said supporting members, cams provided on said sleeves, said cams upon the movement of the sleeves on the supporting members adapted to actuate said arms out of engagement with the film strip carrying spools against the action of said springs whereby the film strip carrying spools may be removed from the carriage.

5. A carriage adapted to be slidably and removably mounted within a viewing device and including a longitudinally extending transparent portion, pairs of brackets mounted on said transparent portion, one pair of said brackets extending outwardly from a longitudinal side edge of the transparent portion and another pair of said brackets extending outwardly from another longitudinal side edge thereof in a diametrically opposite direction from said first-mentioned pair of brackets, combined reel spool equalizing and supporting devices, one of each of said combined reel spool equalizing and supporting devices mounted between one of each of said pairs of brackets and comprising a supporting member including arcuate shaped segments, arms movably mounted on said segments, said arms having arcuate shaped shoes on one of their ends adapted to support film strip carrying spools, pins provided on the other ends of said arms, springs carried by said arms and adapted to force said arms into contact with the film strip carrying spools, ring shaped end plates mounted on said supporting members and secured to said brackets, partial sleeves movably mounted on said supporting members, spaced cams provided on said sleeves, said cams upon the movement of the sleeves on the supporting members adapted to engage said pins for actuating the arms out of engagement with the film strip carrying spools against the action of said springs whereby the film strip carrying spools may be removed from the carriage.

6. A device of the character described including a plurality of carriages detachably connected together and adapted to be slidably and removably mounted within the device, alined longitudinally extending transparent portions provided on said carriages, pairs of brackets mounted on each of said transparent portions, one pair of each of said pairs of brackets mounted on a longitudinal side edge of each of said transparent portions and another pair of each of said pairs of brackets mounted on another longitudinal side edge of each of said transparent portions, said last-mentioned pairs of brackets extending in a diametrically opposite direction from said first-mentioned pairs of brackets, supporting members, one of each of said supporting members mounted between one of each of said pairs of brackets, spring-pressed arms movably mounted on said supporting members, pairs of alined detachably connected spools arranged on diametrically opposite sides of said carriages and engaged by said spring-pressed arms, said spools adapted to carry transparent film strips extending from the spools on one of the sides of the carriages to the spools on the opposite sides of the carriages, means including cams movably mounted on said supporting means and adapted to be actuated for operating the spring-pressed arms out of engagement with the film strip carrying spools whereby the spools may be removed from the carriages.

THOMAS NORTH.
EDWARD L. MIFFLIN, Jr.